United States Patent [19]

Ohyama et al.

[11] 3,721,892

[45] March 20, 1973

[54] POWER RECTIFIER INCLUDING A BRIDGE RECTIFIER CIRCUIT

[75] Inventors: Masayuki Ohyama; Takefumi Nakamizo, both of Toyonaka, Japan

[73] Assignee: Matsushita Electric Industrial Co., Ltd., Osaka, Japan

[22] Filed: Jan. 12, 1972

[21] Appl. No.: 217,197

[52] U.S. Cl. ................................................321/47
[51] Int. Cl. ............................................H02m 7/06
[58] Field of Search: .................................321/10, 47

[56] References Cited

UNITED STATES PATENTS

| 1,766,051 | 6/1930 | Ackerly | 321/10 |
| 2,597,310 | 5/1952 | Fisher | 307/150 |
| 1,758,680 | 5/1930 | Andre | 321/10 |
| 3,177,421 | 4/1965 | Montgomery | 321/47 X |
| 3,328,674 | 6/1967 | Bleicher | 321/10 X |

Primary Examiner—William M. Shoop, Jr.
Attorney—Richard K. Stevens et al.

[57] ABSTRACT

A power rectifier comprising a bridge rectifier circuit and a choke coil for supplying a rectified current to a load wherein said choke coil is divided into two portions respectively inserted in two arms of the bridge circuit to be connected to one terminal of an AC power source, and rectifier means inserted in the other two arms to be connected to the other terminal of the AC power source are utilized not only to flow the rectified current to the load, but also to discharge an energy stored in the load depending on its impedance.

7 Claims, 10 Drawing Figures

POWER RECTIFIER INCLUDING A BRIDGE RECTIFIER CIRCUIT

The present invention relates to a power rectifier and, more particularly, a power rectifier which supplies a rectified current to an impedance load.

First, an explanation will be made of conventional devices of this kind. One example of such devices employs a choke coil with a single winding, instead of two windings as in the device according to the present invention, on the output side of a bridge rectifier circuit. In such a device, the presence of the single-winding choke coil prevents the energy stored in a load from discharging through the rectifiers, and therefore it is necessary to connect an additional rectifier in parallel with a thyristor in opposite directions, resulting in increased production costs. The necessity of the single-winding choke coil arises from the need to prevent the breakdown of the thyristor which otherwise might occur when the output side of the rectifier circuit is short-circuited upon the firing of the thyristor.

In another example of the conventional devices, a single-winding choke coil is inserted in the input side of a bridge rectifier circuit in order to obviate the above disadvantage, i.e., to eliminate the need for the provision of an additional rectifier. In this case, however, the disadvantage is that alternate magnetic fields are produced in the choke coil, with the result that a delay in phase occurs, lowering the power factor. The reason why the need of an additional rectifier is eliminated in this example is that, as in the device of the present invention, the stored energy can flow in a circuit comprising two series arms of the bridge rectifier.

For the purpose of improving the power factor, one method so far tried consisted of inserting a smoothing capacitor in the output side of the rectifier circuit. This trial, however, ended in failure since electric charges stored in the smoothing capacitor were released at the time of firing of the thyristor, making substantially impossible insertion of the smoothing capacitor.

An object of the present invention is to provide a power rectifier comprising a bridge rectifier circuit having a pair of input terminals connected to an AC power source and a pair of output terminals connected to a load, and a choke coil having two windings, one of said two windings being inserted in one of two arms connected to one of said input terminals and the other of said two windings being inserted in the other of said two arms, said two windings having such polarities that the magnetic fields produced therein in operation of the power rectifier are substantially cancelled by each other.

Accordingly, the rectifiers in two arms connected to the other input terminal are served to discharge an electric energy stored in the load depending on its impedance therethrough, resulting in no need of any additional rectifier for discharging the electric energy, as is necessary in the conventional device. Moreover, the choke coil furnishes substantially no magnetic field in operation of the power rectifier thereby preventing reduction of the power factor.

Another object of the present invention is to provide a power rectifier further comprising a first smoothing capacitor connected between the cathode of a rectifier in one of a pair of two opposite arms of the bridge rectifier circuit and one of the electrodes of a rectifier in the other of said two opposite arms and a second smoothing capacitor connected between the anode of a rectifier in one of another pair of two opposite arms of said bridge rectifier circuit and one of the electrodes of a rectifier in the other of the last-mentioned two opposite arms, thereby insuring a substantially rippleless DC current and a higher power factor.

A further object of the present invention is to provide a power rectifier comprising a series connection of a capacitor and a resistor connected between a connection point which connects the one winding of the choke coil inserted in one arm with the rectifier in the one arm and another connection point which connects the other winding inserted in the other arm with the rectifier in the other arm, whereby an induced pulse current in one of the windings due to a pulse current carried through the other winding can be absorbed in the series connection of the resistor and the capacitor thereby reducing generation of any abnormal pulse due to, for example, switching of a thyristor in the load circuit.

Further, the device according to the present invention is provided with a pair of smoothing capacitors which are inserted respectively between the cathode of a first rectifier element in one arm of the rectifier circuit and the anode of a second rectifier element in the opposite arm and between said cathode and the anode or cathode of a rectifier in the arm opposite to said second rectifier, thereby making it possible to obtain a perfect DC current with a high power factor.

Furthermore, the device according to the present invention is characterized by a series circuit consisting of a resistor and a capacitor, which circuit is inserted between a junction point connecting a rectifier to one of the windings of the choke coil and another junction point connecting another rectifier to the other winding of the choke coil. This arrangement permits the capacitor and resistor to absorb a pulse voltage which is generated in one of the windings by a current flowing in the other winding, thus removing abnormal pulses generated when the thyristor is fired and cut off.

The above and other objects, features and advantages will be made apparent by the detailed description taken in conjunction with the accompanying drawings, in which.

Figure 4:
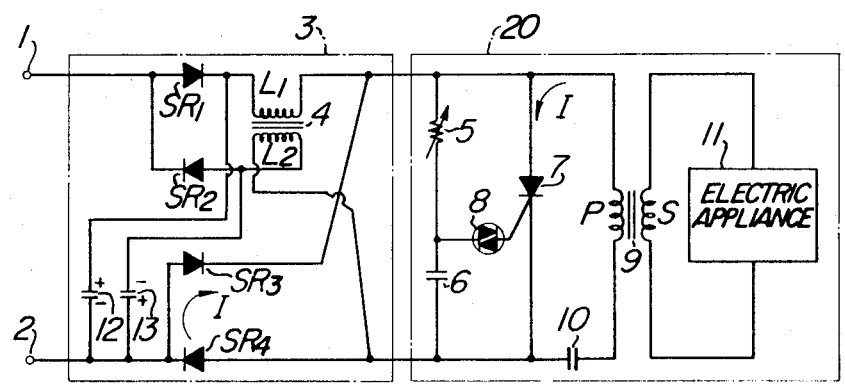
FIG. 4 is a circuit diagram showing another embodiment of the present invention.
Figure 5:
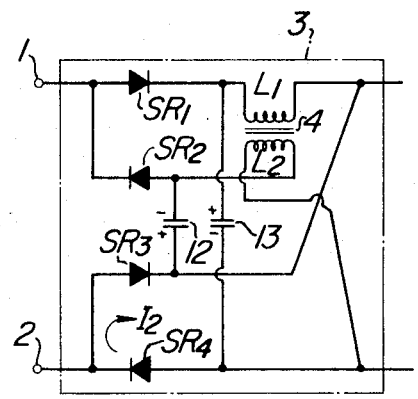
FIG. 5 is a circuit diagram showing a modification of the bridge rectifier circuit incorporated in the device of FIG. 4.
Figure 6:
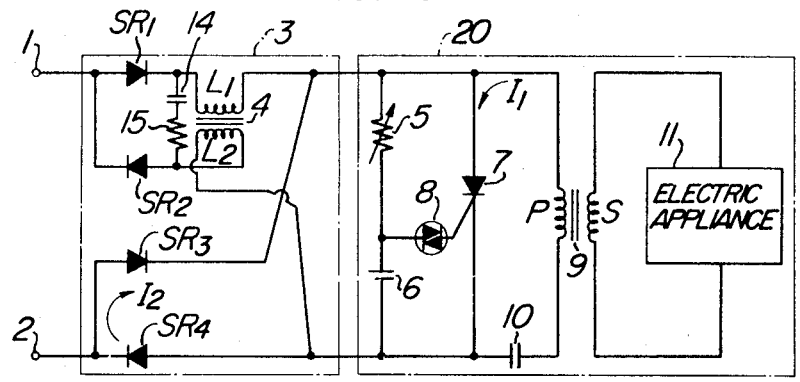
FIG. 6 is a circuit diagram showing still another embodiment of the present invention.
Figure 7:
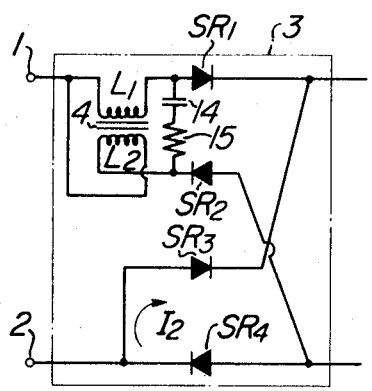
Figure 8:
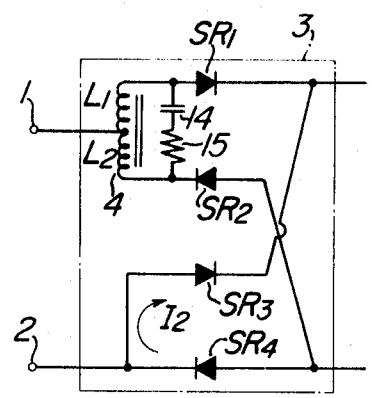
Figure 9:
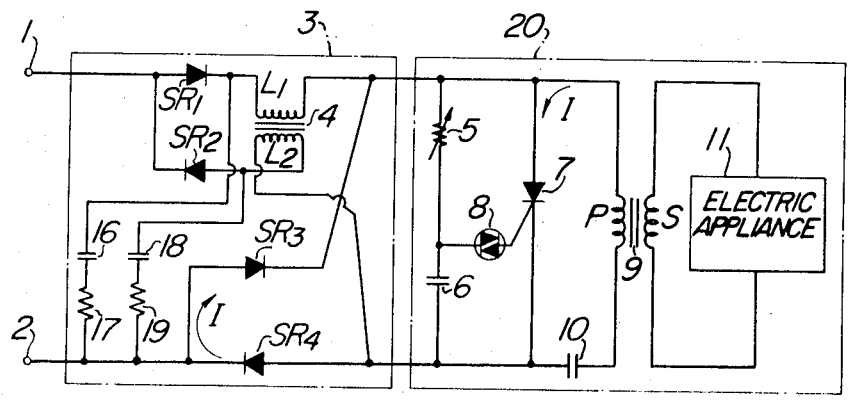
Figure 10:
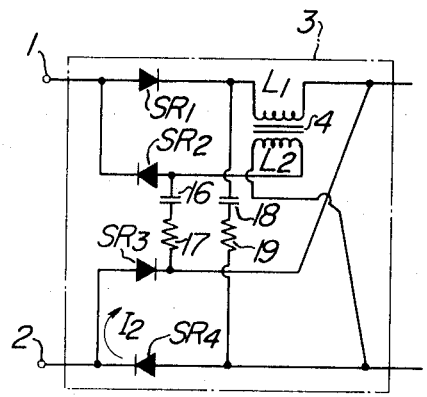

FIGS. 7 and 8 are circuit diagrams showing modifications of the bridge rectifier circuit shown in FIG. 6; and FIGS. 9 and 10 show modifications of the bridge rectifier circuits shown in FIGS. 4 and 5, respectively.

Figure 1:
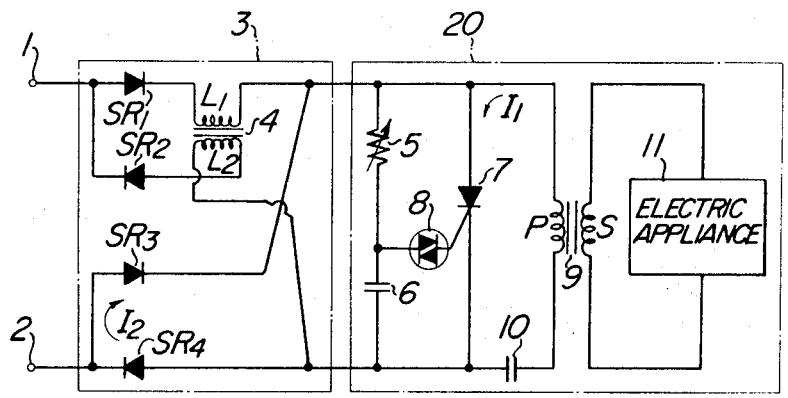
FIG. 1 is a circuit diagram showing an embodiment of the present invention.

The first embodiment of the invention will be now explained with reference to FIG. 1. In this figure, numeral 3 indicates a power rectifier according to the invention, and numerals 1 and 2 show AC input terminals. The power rectifier comprises a bridge rectifier circuit comprising rectifiers $SR_1$, $SR_2$, $SR_3$ and $SR_4$ and with its input side connected to the terminals 1 and 2, and numeral 4 a choke coil with a pair of windings $L_1$ and $L_2$ inserted in both arms of the bridge respectively in such a manner as to prevent the occurrence of alternate magnetic fields, i.e., to form magnetic fluxes in the same direction. Numeral 20 indicates a load including, for example, a self-oscillator. Numerals 5 and 6 show a variable resistor and a capacitor respectively connected in series with the output side of the rectifier circuit 3, numeral 7 a thyristor such as a silicon-controlled rectifier inserted in the output side of the rectifier circuit 3, numeral 8 a gate diode inserted between the gate of the thyristor 7 and a junction point between the resistor 5 and the capacitor 6, and numeral 9 an output transformer with its primary winding P connected with the thyristor 7 through a series capacitor 10 and with its secondary winding S connected with a final load such as an electric appliance 11.

The operation of the device according to the invention will now be explained.

When an AC voltage is applied between the terminals 1 and 2, a fully-rectified voltage is produced on the output side of the bridge rectifier circuit 3, which rectified voltage functions to charge the capacitor 10. At the same time, the capacitor 6 is also charged through the resistor 5 with a certain delay in time. When this charge voltage reaches the breakover voltage of the gate diode 8, the diode 8 passes a pulse current to the gate of the thyristor 7 to put it into a conductive state. As a consequence, the charge voltage across the capacitor 10 is applied to the primary winding P of the transformer 9 in the form of a discharged current $I_1$, with the result that a voltage is induced in the secondary winding S and applied across the load 11. As mentioned above, positive portions of the oscillating current generated by the capacitor 10 and the primary winding P take the form of current $I_1$, whereas negative portions thereof flow from the rectifier $SR_4$ to rectifier $SR_3$ in the form of current $I_2$. Under this condition, the thyristor 7 is in a cut-off state, which is followed by conduction again of the thyristor 7 which is caused by positive portions of the current. This process is repeated in the subsequent operations.

Figure 2:
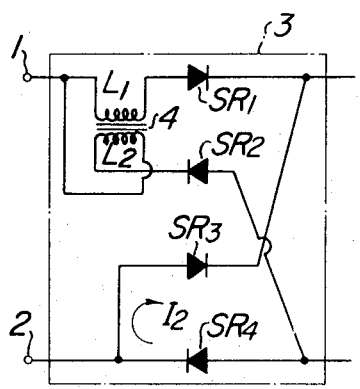
FIGS. 2 and 3 show circuit diagrams of different modifications of the bridge rectifier circuit shown in FIG. 1.
Figure 3:
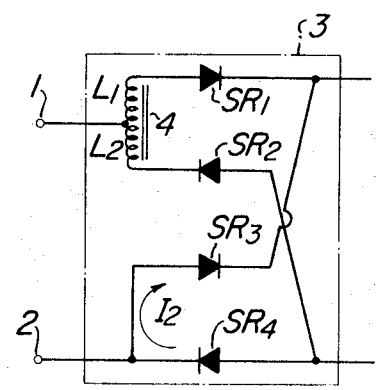

Another embodiment of the power rectifier circuit 3 is illustrated in FIG. 2, which shows that the dual-winding choke coil 4 may be inserted in such a manner as shown in the drawing. Still another way of insertion of the choke coil is shown in FIG. 3 without affecting the advantages of the invention. Although the last-mentioned choke coil consists of a single winding, it will be considered as a dual-winding for the purpose of the invention in view of an intermediate tap provided thereon.

Instead of the smoothing capacitors 12 and 13, pulse-removing capacitors 16 and 18 may be inserted, together with series damping resistors 17 and 19, as shown in FIGS. 9 and 10, to accomplish pulse removal.

Another embodiment of the invention will be now explained with reference to FIGS. 4 and 5. In this embodiment, like elements are identified by like reference numerals in the first embodiment. For these elements, refer to the explanation about the first embodiment.

In this embodiment, a smoothing capacitor 12 is inserted between the cathode of the rectifier $SR_1$ and the cathode of the rectifier $SR_4$, and a smoothing capacitor 13 between the anode of the rectifier $SR_2$ and the cathode of the rectifier $SR_3$ to achieve a high power factor. This arrangement enables production of a smoothed output voltage of the rectifier circuit. Resistors may be connected in series with the smoothing capacitors 12 and 13.

A modification of the arrangement of the smoothing capacitors 12 and 13 is shown in FIG. 5, in which the smoothing capacitor 12 is connected between the anode or, in other words, the capacitor 12 is connected between both of the downstream sides of the two windings $L_1$, $L_2$ of the choke coil 4 in current flows of rectifier $SR_2$ and the cathode of rectifier $SR_3$, whereas the smoothing capacitor 13 is inserted between the cathode of the rectifier $SR_1$ and the anode of the rectifier $SR_4$, or, in other words, the capacitor 13 is connected between both of the upstream sides of the two windings $L_1$, $L_2$ in current flows, thereby achieving the same effect as in the circuit of FIG. 4.

A third embodiment of the invention will be now explained with reference to FIGS. 6 to 8, in which like component elements are marked with like numerals as in the first and second embodiments. For such elements, reference should be made to the description about the first embodiment.

In the third embodiment, a series circuit consisting of a capacitor 14 and a resistor 15 is inserted between a junction point connecting the rectifier $SR_1$ of the bridge rectifier circuit 3 to a winding $L_1$ of the choke coil 4 and another junction point connecting the rectifier $SR_2$ of the same circuit to the other winding $L_2$ of the choke coil 4. As long as a current flows in the rectifier $SR_1$ and the winding $L_1$, no current flows in the rectifier $SR_2$ and the coil $L_2$. In other words, the rectifier circuit is opened by the rectifier $SR_2$, in which case a pulse voltage generated in the winding $L_1$ by conduction and cut off of the thyristor is induced in the winding $L_2$. This pulse voltage induced in the coil $L_2$ is absorbed by the capacitor 14 and damped by the resistor 15.

What we claim is:

1. A power rectifier comprising a bridge rectifier circuit having a pair of input terminals connected to an AC power source and a pair of output terminals, first and second sets of two arms each, wherein each set includes rectifiers and is respectively connected to an input terminal, a choke coil, having two windings, wherein one winding is in circuit in one arm of the first set and the other winding is in circuit with the other arm of the first set and wherein the two windings are connected in such polarities so as to produce magnetic fluxes in the same direction in order to prevent the occurrence of alternating magnetic fields; and a load circuit having an LC resonance circuit connected to the pair of output terminals whereby negative portions of the oscillating current generated in the LC resonance circuit flows serially through rectifier elements of the second set.

2. A power rectifier according to claim 1, wherein the bridge rectifier circuit further comprises a first smoothing capacitor connected between the cathode of a rectifier in one arm of two opposite arms of the first set and one of the electrodes of a rectifier in one arm of two opposite arms of the second set, and a second smoothing capacitor connected between the anode of a rectifier in the other arm of the first set and one of the electrodes of a rectifier in the other arm of the second set.

3. A power rectifier according to claim 1, wherein the bridge rectifier circuit further comprises a first smoothing capacitor connected between both of the downstream sides of said two windings in current flows and a second smoothing capacitor connected between both of the upstream sides of said two windings in the current flows.

4. A power rectifier according to claim 1, wherein the two windings of the choke coil are connected in series, and wherein the bridge rectifier circuit further comprises a series connection of a capacitor and a resistor connected across both ends of the series connection of the two windings.

5. A power rectifier according to claim 1, wherein the bridge rectifier further comprises a first series connection of a capacitor and a resistor connected between both of the downstream sides of the two windings in current flows, and a second series connection of a capacitor and a resistor connected between both of the upstream sides of the two windings in the current flows.

6. A power rectifier according to claim 1, wherein the bridge rectifier circuit further comprises a first series connection of a capacitor and a resistor connected between the cathode of a rectifier in one arm of two opposite arms of the first set and one of the electrodes of a rectifier in one arm of two opposite arms of the second set, and a second series connection of a capacitor and a resistor connected between the anode of a rectifier in the other arm of the first set and one of the electrodes of a rectifier in the other arm of the second set.

7. A power rectifier according to claim 1, wherein the bridge circuit further comprises a series connection of a capacitor and a resistor connected between one junction point of a rectifier element and one winding of the choke coil serially connected in one arm of the first set and another junction point of another rectifier element and the other winding of the choke coil serially connected in the other arm of the first set.

* * * * *